United States Patent [19]
Walters et al.

[11] Patent Number: 5,837,319
[45] Date of Patent: Nov. 17, 1998

[54] SPIN PROCESS FOR HIGHLY CONFORMAL COATINGS

[75] Inventors: David W. Walters, Walworth; Susan S. Collier, LeRoy, both of N.Y.

[73] Assignee: Eastman Kodak Company, Rochester, N.Y.

[21] Appl. No.: 670,983

[22] Filed: Jun. 28, 1996

Related U.S. Application Data

[63] Continuation of Ser. No. 359,371, Dec. 20, 1994, abandoned.

[51] Int. Cl.⁶ .................................................. B05D 3/12
[52] U.S. Cl. ..................... 427/240; 427/162; 427/385.5
[58] Field of Search ................................. 427/240, 385.5, 427/162

[56] References Cited

U.S. PATENT DOCUMENTS

| | | | |
|---|---|---|---|
| 4,175,145 | 11/1979 | Fechter | 427/240 |
| 4,267,212 | 5/1981 | Sakawaki | 427/240 |
| 4,353,937 | 10/1982 | Chiba et al. | 427/130 |
| 4,551,335 | 11/1985 | Ericson et al. | 427/48 |
| 4,587,139 | 5/1986 | Hagan et al. | 427/130 |
| 5,080,946 | 1/1992 | Takagisi et al. | 428/64 |
| 5,122,435 | 6/1992 | Schmitt et al. | 430/270 |
| 5,188,863 | 2/1993 | de Graaf | 427/240 |
| 5,199,988 | 4/1993 | Kamezaki et al. | 118/52 |
| 5,405,813 | 4/1995 | Rodrigues | 427/240 |
| 5,571,560 | 11/1996 | Lin | 427/240 |

FOREIGN PATENT DOCUMENTS 62-109043   5/1987   Japan .

OTHER PUBLICATIONS

"Mechanism for the Local Planarization of Microscopically Rough Surfaces by Drying Thin Films of Spin–Coated Polymer/Solvent Solutions", Journal of Electrochemical Society, vol. 137 (1990) (no date).

Principles of Optical Disc Systems, pp. 114 and 115 (no date).

*Primary Examiner*—Janyce Bell
*Attorney, Agent, or Firm*—Arthur H. Rosenstein

[57] ABSTRACT

A substrate is rotated at a first bead of less than or equal to 500 rpm per second. A coating composition solution is applied to the substrate at this point. The substrate is then accelerated at a first rate of between 300 and 1200 rpm per second. When the speed of the substrate reaches approximately 3000 rpm per second, a second acceleration is initiated at a second rate of greater than or equal to 3000 rpm. The coating composition is set and the substrate is decelerated. This process provides a more conformal coating of the composition providing better push-pull unwritten variability.

4 Claims, 5 Drawing Sheets

SPIN PROCESS FOR HIGHLY CONFORMAL COATINGS

This is a Continuation of application Ser. No. 08/359,371, filed Dec. 20, 1994, now abandoned.

FIELD OF THE INVENTION

The present invention relates to a process for coating a low viscosity, highly volatile fluid onto a featured substrate in a spin coating process. More particularly, the present invention provides a method for producing reduced radial variability in coating conformality on CD media thereby improving unwritten performance.

BACKGROUND OF THE INVENTION

Spin coating is a process commonly used to coat thin film onto a flat substrate. During the process of spin coating, a small quantity of fluid containing a volatile solvent, is dispensed onto a rotating substrate. The substrate rotational speed is then accelerated to a high speed, typically several thousand rpm. The centrifugal forces result in a radial fluid flow during which most of the fluid is rotated off the substrate. Simultaneously, evaporation of the fluid begins at the inner diameter and progresses to the outer substrate rim, leaving a thin film. The solvent continues to evaporate from the rotating substrate because of atmospheric gas flowing about the substrate, and the film eventually dries. At this point, the substrate is decelerated to rest. The resulting coating thickness and uniformity are highly sensitive to both the fluid flow by spin-off and evaporation. In photo CD as well as multi-write optical media, the objective is to balance the spin coating process conditions to obtain a uniform dye deposit across the substrate that is characterized by a molded, grooved surface.

The spin coating process is carried out by dispensing a sufficient amount of fluid onto a substrate at the inner diameter to flood it with coating fluid followed by a first stage low rotational speed and an acceleration to a second higher rotational speed. This is described in U.S. Pat. No. 5,199,988. If necessary, the substrate can be rotated at a series of increasing rotational speeds as described in U.S. Pat. No. 4,267,212. Rotation proceeds for a specified amount of time during which the fluid flows and the film thins by a combination of centrifugal and evaporation forces (See *Journal of Electrochemical Society*, 137: 1990). Finally, the substrate is decelerated to rest. An example of such a spin profile is shown in FIG. 1.

It has been found that in the process described above, the applied coating conformality on a featured substrate depends on the particular coating fluid solvent and the coating process spin cycle, such as time, rotational speed and rotational speed rate of change. Therefore, these parameters are controlled by controlling the coating process spin cycle parameters in a linked relationship with each other. Prior art methods, although somewhat successful, do not provide a radially uniform conformal coating on the substrate when using the spin coating process. The present invention is a process in which a decreased conformality variability coating is obtained using the spin coating process.

SUMMARY OF THE INVENTION

The present invention is a process for spin coating a substrate. The process includes providing a grooved substrate and applying a liquid coating composition to the substrate at an inner diameter. The substrate is spun at a speed of less than or equal to 500 rpm until the coating composition, at a predetermined diameter of the substrate, has reached a predetermined thickness. The substrate is then accelerated at a first rate of about 300 rpm per second to about 1200 rpm per second until the rotational speed of the substrate is less than or equal to about 3000 rpm. The substrate is then accelerated at a second rate of greater than 3000 rpm per second during which the coating composition on the substrate is set. This reduces the radial conformality of the coating composition thereby producing a reduction of the unwritten performance variability.

The reduced unwritten performance variability advantageously provides a superior product.

For a better understanding of the present invention together with other objects, advantages and capabilities thereof, reference is made to the following description and appended claims in connection with the above described drawings.

DETAILED DESCRIPTION OF THE PREFERRED EMBODIMENT

The present invention provides a spin coating process which can coat a low viscosity fluid to form a thin film on a substrate that results in low variability in unwritten performance. Unwritten performance such as push-pull is related to phase difference which is related to conformality.

A description of optical phase difference and push-pull can be found in U.S. Pat. No. 5,080,946, (see column 6, lines 19–60). For the present application, the following is a general definition of the term radial contrast before recording. The signals before recording include:

$I_1$—which corresponds to the land level signal.
$I_g$—which corresponds to the groove level signal.
The radial contrast RC before recording is defined as:

$$RC = 2 \times \left( \frac{I_1 - I_g}{I_1 - I_g} \right)$$

Figure 1:
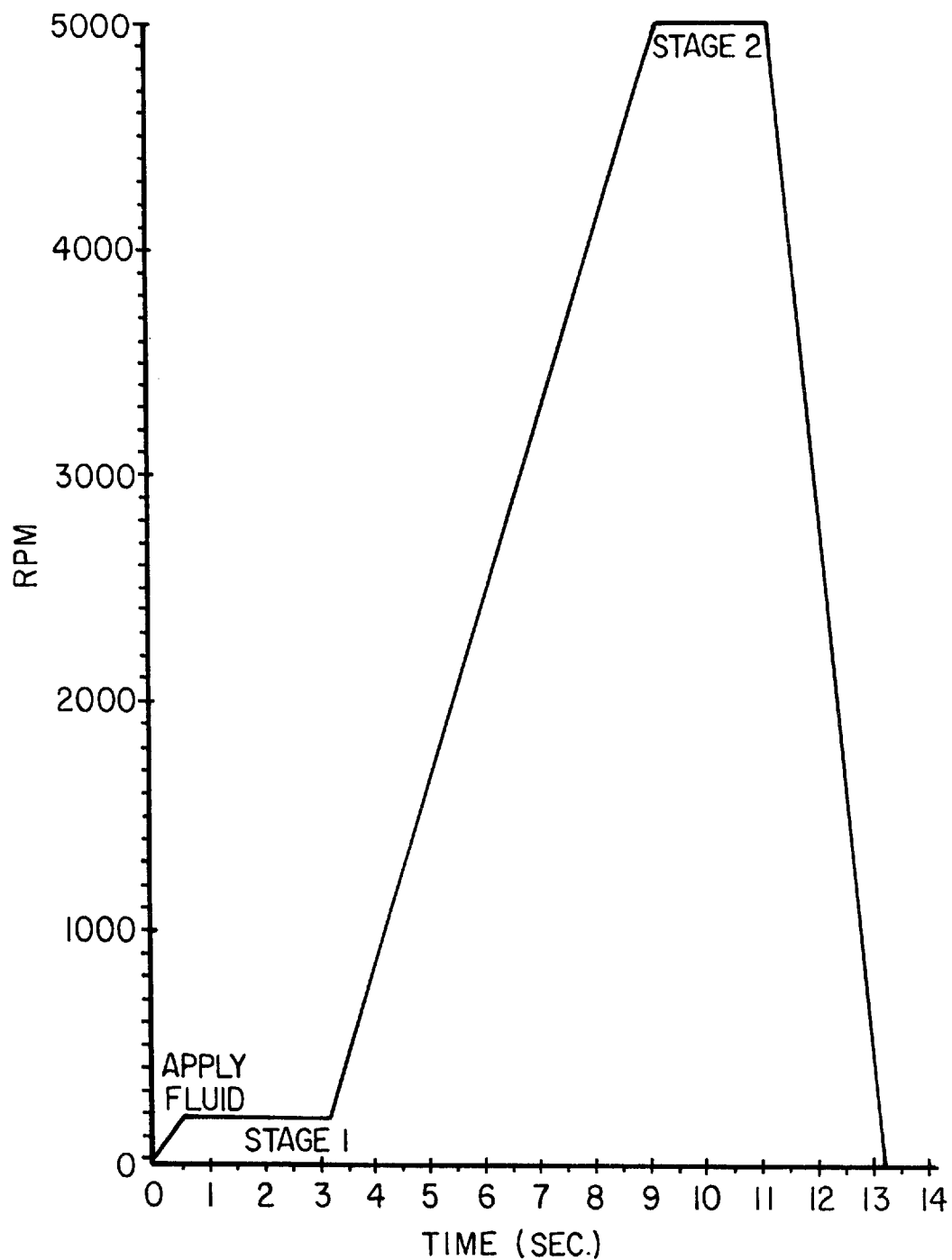
FIG. 1 shows the spin profile of the prior art spin coating process.
Figure 2:
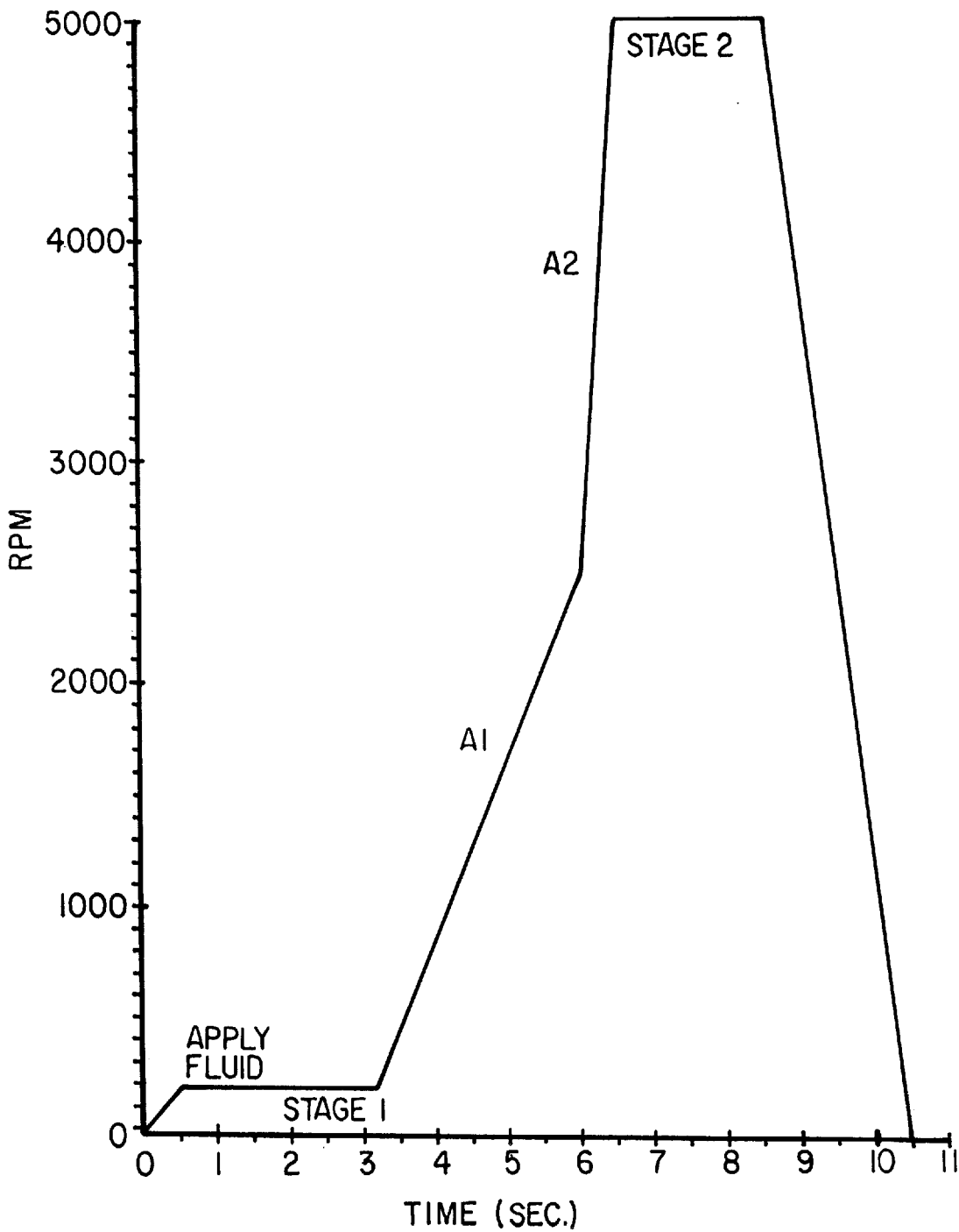
FIG. 2 shows the spin profile of the present invention.

The novel coating process of the present invention includes the following elements: low speed fluid application followed by; a first stage low rotational speed and two linked spin cycle accelerations to a second stage high rotational speed. An example of such a spin coating profile is shown in FIG. 2. The first rotational acceleration step establishes coating thickness. The second linked higher acceleration step increases the applied coating conformality at the outer diameter of the substrate, thereby reducing the variability of the unwritten push-pull and radial contrast across the disk.

The time at which the second acceleration is initiated affects the subsequent increase in conformality, unwritten push-pull, and unwritten radial contrast.

FIG. 2 shows the linked acceleration spin profile. The substrate to be coated is initially accelerated to a speed of less than or equal to 500 rpm and the coating fluid is applied. After the fluid is applied, the substrate is accelerated at a first rate of about 300 rpm per second to about 1200 rpm per second until the rotational speed of the substrate is less than or equal to approximately 3000 rpm. This is shown generally as A1 in FIG. 2. The substrate is then accelerated at a second rate of greater than approximately 3000 rpm per second during which the coating composition is set. This is shown generally as A2. When the speed of the substrate reaches approximately 5000 rpm, the acceleration is stopped. The speed of 5000 rpm is the maximum speed possible with the present equipment. The substrate is rotated at this speed for a period of time sufficient to set the coating composition. Once the coating composition is set the substrate is decelerated and the coating process is complete. In the examples shown in FIGS. 3 and 4 the substrate was polycarbonate having a spiral grooved track between lands. The coating composition included an organic solvent. The organic solvent can include octane, dioxane, ethylcyclohexane, dimethylecyclohexane, orthoxylene, methoxypropanol, methlycyclohexane, diacetone alcohol and others.

Figure 3:
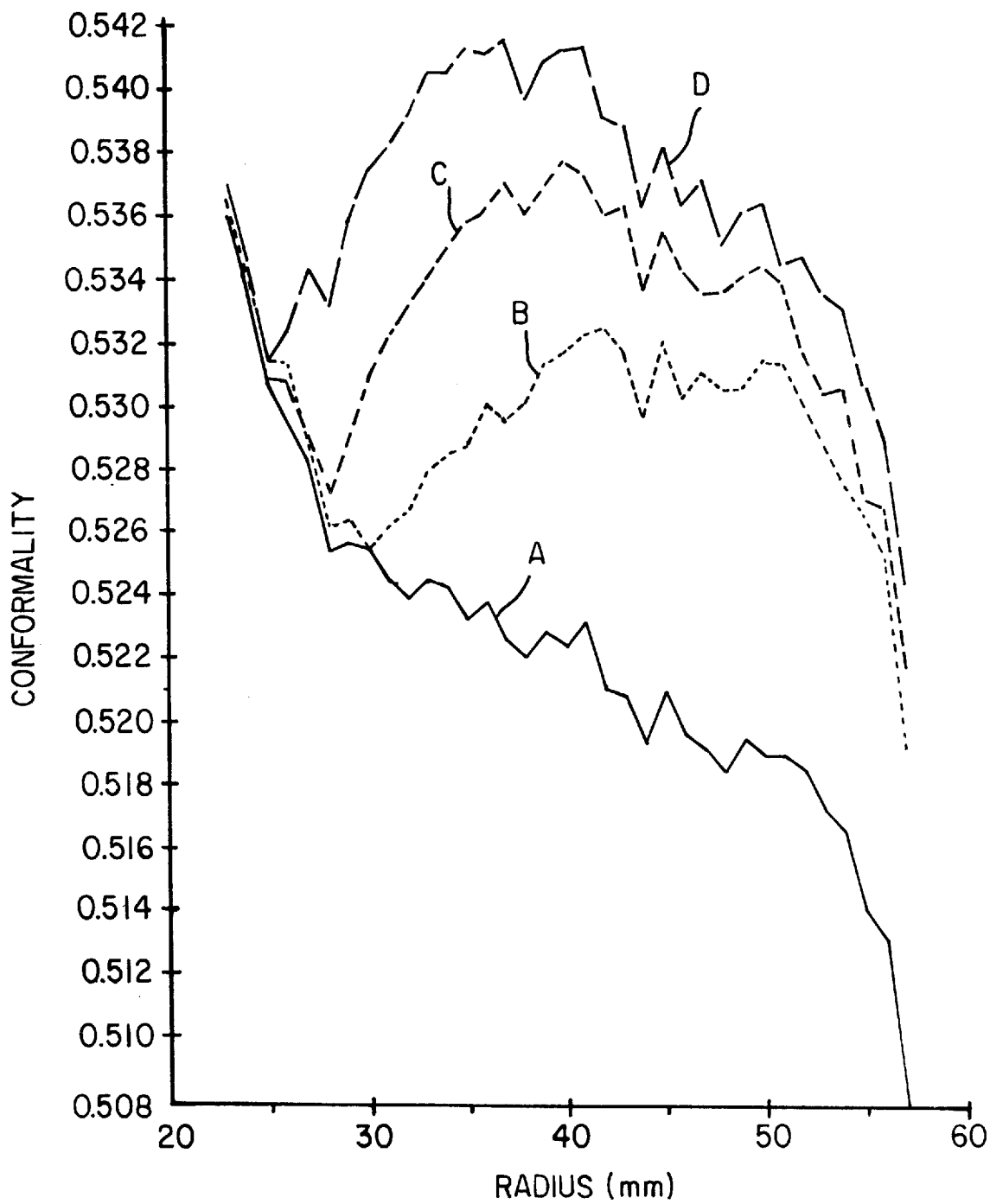
FIG. 3 shows a comparison of the conformality of the coating as a function of radius using the prior art spin profile and the present invention spin profile.

FIG. 3 shows a conformality of the coating composition as a function of the second acceleration. Line A shows what happens when there is no second acceleration. As shown in FIG. 3, the conformality shows a steady decline from the inner diameter to the outer diameter. Lines B, C and D all use the process of the present invention. Line B initiates the second acceleration at approximately 3 seconds after the first acceleration. The angular speed of the substrate at the initiation of the second acceleration was approximately 2600 rpm. Line C initiates the second acceleration approximately 2.8 seconds after the first acceleration and Line D initiates the second acceleration approximately 2.6 seconds after the first acceleration. As can be seen from FIG. 3, the conformality variability of the coating composition is reduced using the linked acceleration profile of the present invention. In these trials the first acceleration rate A1 was approximately 800 rpm/sec and the second acceleration rate A2 was approximately 4800 rpm/sec.

Figure 4:
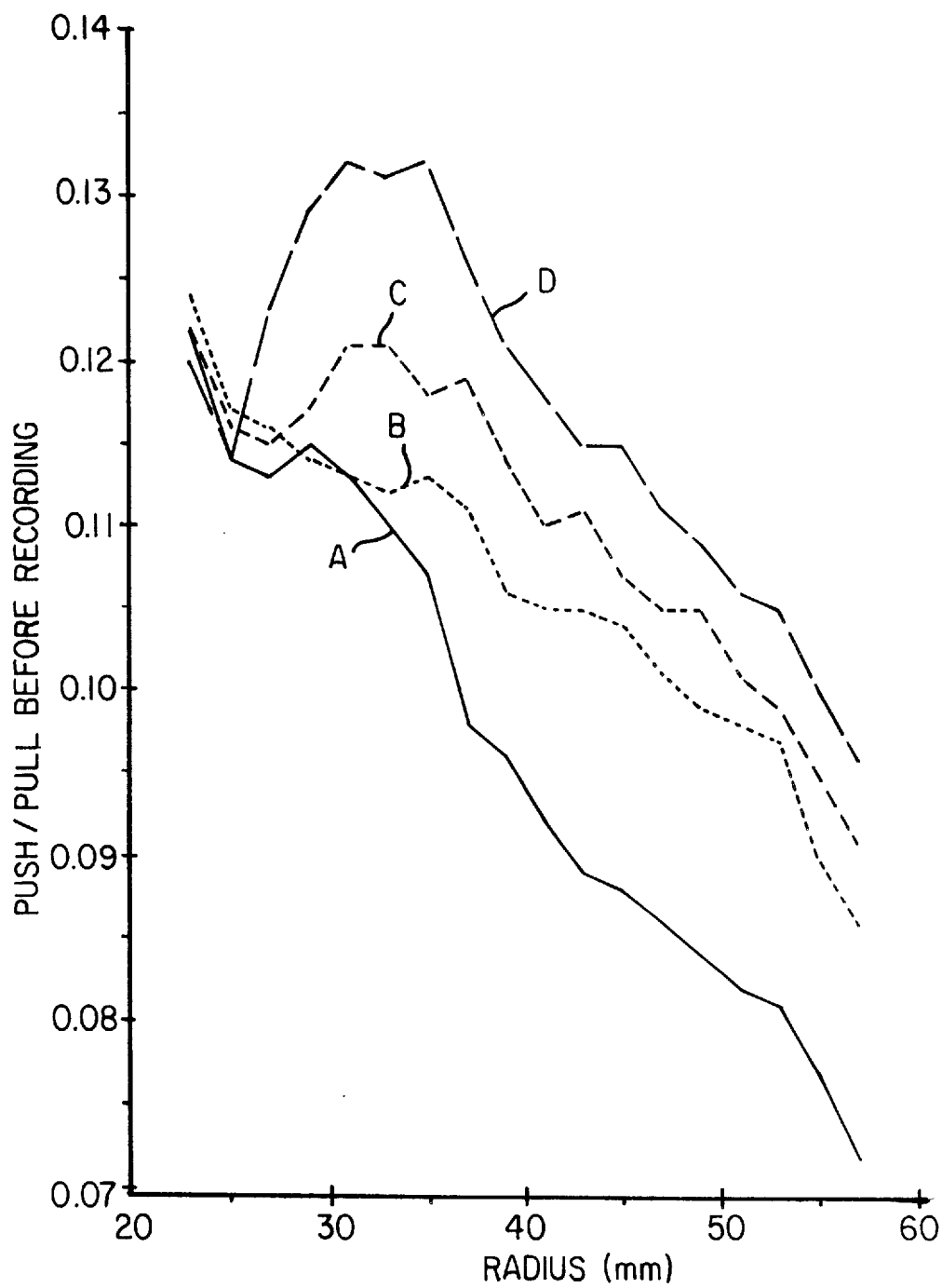
FIG. 4 shows a comparison of the unwritten push-pull performance as a function of radius of a substrate coated using the prior art spin profile and the present invention spin profile.

FIG. 4 shows the push-pull before recording as a function of the radius. In FIG. 4 the lines A, B, C and D correspond to the lines A, B, C and D of FIG. 3. It is apparent that in cases B and C the push-pull variability is reduced by the application of the second acceleration.

Figure 5:
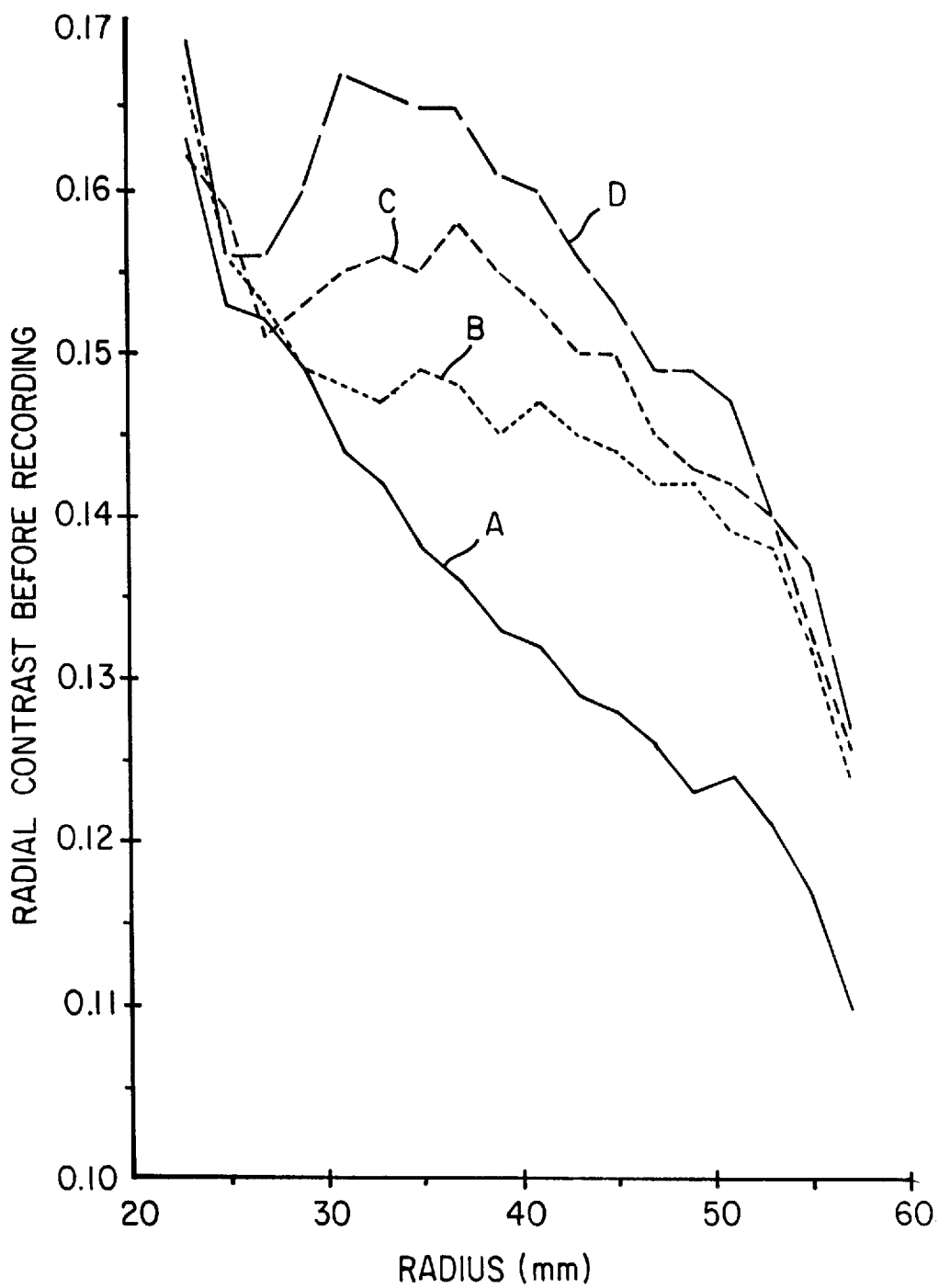
FIG. 5 shows a comparison of the radial contrast before recording as a function of radius of a substrate coated using the prior art spin profile and the present invention spin profile.

FIG. 5 shows the radial contrast before recording as a function of radius. Again, lines A, B, C and D correspond to lines A, B, C and D of FIGS. 3 and 4. As can be seen from FIG. 5, the radial contrast variability is reduced using the spin profile linked acceleration process of the present invention. Again, it is apparent that from cases B, C and D that radial contrast is improved by application of the second acceleration.

While there has been shown and described what are at present considered the preferred embodiments of the invention, it will be obvious to those skilled in the art various alterations and modification may be made therein without departing from the scope of the invention.

What is claimed is:

1. A process for spin coating a substrate comprising:

providing a spiral-grooved substrate;

applying a liquid coating composition to the substrate;

spinning the substrate at a speed of less than or equal to 500 rpm until the coating composition, at a inner diameter of the substrate has reached a thickness;

accelerating the rotational speed of the substrate in two linked steps, the first step comprising accelerating the rotational speed at a first rate of about 300 rpm/sec to 1200 rpm/sec or, until the rotational speed of the substrate is less than or equal to 3000 rpm; and the second step comprising accelerating the rotational speed of the substrate at a second rate of greater than or equal to 3000 rpm/sec during which the coating solvent is evaporated.

2. The process according to claim 1 wherein the coating composition comprises an organic solvent.

3. The process according to claim 2 wherein the organic solvent for the coating composition comprises octane and dioxane.

4. The process according to claim 2 wherein the substrate is polycarbonate.

* * * * *